Feb. 4, 1969 W. E. RIDGEWAY 3,425,555
PROCESS FOR RECOVERY OF CONTAMINANTS FROM THE GROUND
Filed Nov. 25, 1966
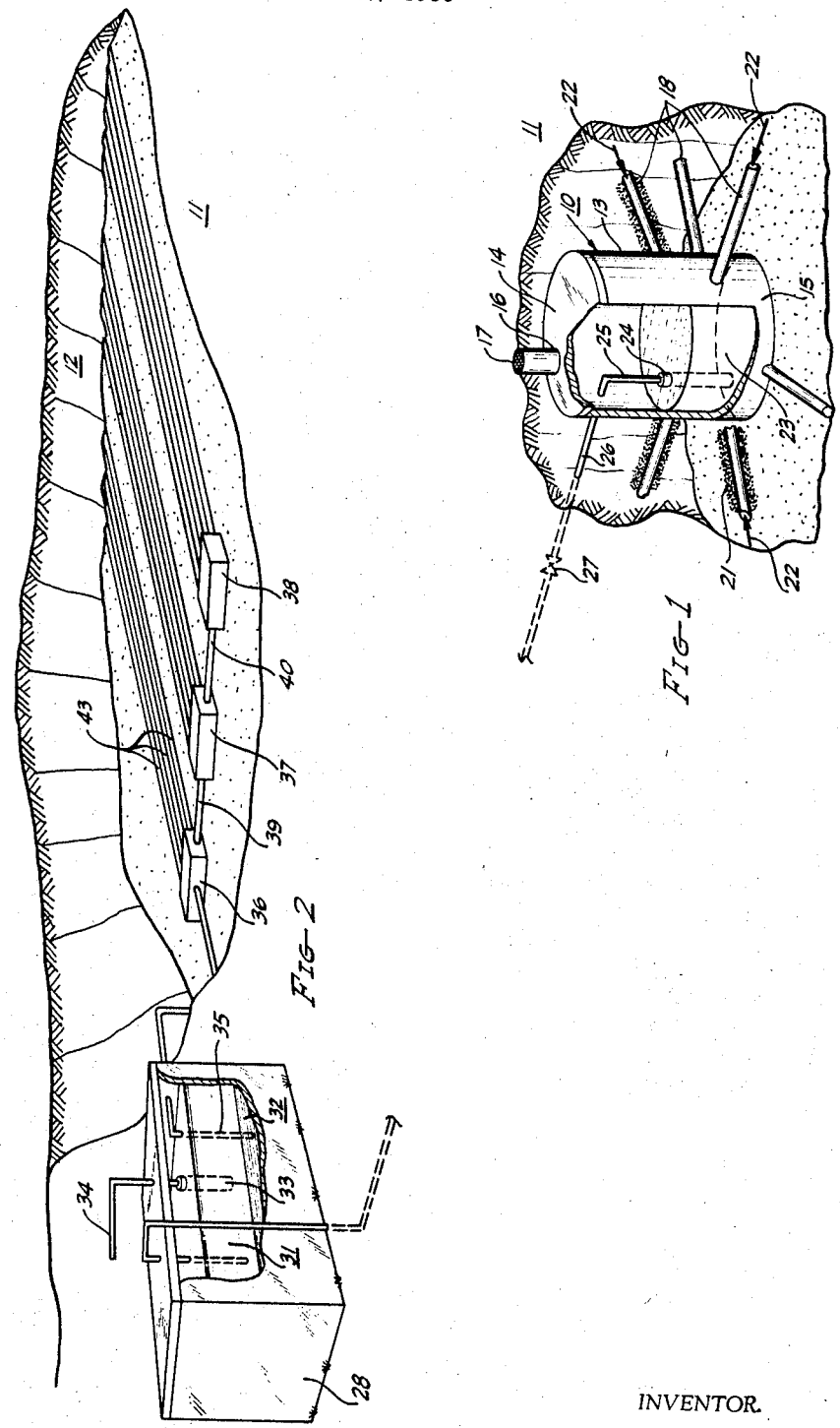
INVENTOR.
WILLIAM E. RIDGEWAY
BY
ATTORNEY

United States Patent Office

3,425,555
Patented Feb. 4, 1969

3,425,555
PROCESS FOR RECOVERY OF CONTAMINANTS FROM THE GROUND
William E. Ridgeway, Rolling Meadows, Ill., assignor to Union Oil Company of California, Los Angeles, Calif., a corporation of California
Filed Nov. 25, 1966, Ser. No. 597,013
U.S. Cl. 210—65          2 Claims
Int. Cl. B01d 57/00

ABSTRACT OF THE DISCLOSURE

Petroleum products which have escaped into the ground are removed by applying water to the area to form a mixture of water and petroleum. This mixture is percolated through the ground to the water table and collected by a plurality of collecting fingers, forwarded to a collecting basin and then to a phase separation tank.

---

This invention relates to a process for recovering contaminants from the ground and more specifically to the recovery of petroleum products which have escaped into the ground usually from their containers.

The escape or loss of petroleum products such as oil, gasoline and the like into the ground presents serious problems from many standpoints. There is an ever-present possibility of fire, and the odor is longlasting and obnoxious. Buildings can be permeated and deteriorated, while many forms of plant life such as grass and even mature oak trees are killed. Such hazards are over and above the immediate financial loss incurred when these petroleum products inadvertently escape due to container and pipe leaks and similar mishaps. If the loss occurs near a resort area, the petroleum product may enter a river, lake or drinking well, kill the fish life and render the water unfit for drinking and swimming. The combined effect on the ground, buildings and water will of course completely destroy the property values of a resort or any area.

Some of the escaped petroleum product may be recovered by excavating the ground which has been affected, and treating the ground to reclaim it. However not only is excavating costly and unsightly, but it also fails to recover a substantial portion of the petroleum product which usually seeps into crevices and depressions below the excavated area.

It is also possible to recover the petroleum product by digging a trench along the surface of the area affected, water flushing it into the trench and then separating it from the water. But this does not reduce the fire hazard and the operation will be affected adversely if rain occurs and the contents of the trench overflows onto surrounding areas. Another drawback in using an open trench is that after recovery from an area has been completed, the trench must be backfilled. Consequently any ancillary benefits provided by the trench, such as flood control are lost.

It may of course be desirable to remove from the ground materials other than petroleum products. This will occur when unwanted contaminants, mineral deposits, etc. require removal and it is not feasible or economical to excavate an area and chemically treat the deposit.

With the foregoing background in mind, it is an object of this invention to provide a process for recovering contaminants such as petroleum products from the ground.

Another object is to provide a process for efficiently recovering petroleum products and the like from the ground with a minimum of fire hazard and inconvenience to the public.

Another object is to recover contaminants as economically as possible with a minimum of personnel.

Another object is to control the flow of an underground water table by creating a positive flow underground.

Another object is to create sufficient disturbed flow of an underground water table by removing contaminants from otherwise stagnant pools trapped in areas underground.

Another object is to provide a process for reducing flooding caused by underground water seepage.

Another object is to provide a process for removing minerals or contaminants from an area.

Other objects of the invention will become more apparent from the description to follow and the drawings.

The objects of the invention are attained by a process comprising circulating a flow of water or suitable liquid through the ground containing the contaminant to be removed, passing the mixture of liquid and contaminant into a collector basin, separating the liquid and contaminant and removing the contaminant from the liquid. Preferably the liquid may be recirculated for re-use. In the case of petroleum products, water is the least expensive and the most readily available liquid. Where minerals or contaminants are concerned, other liquids which have a specific leaching action may be employed (either alone or in conjunction with water) to effect the desired removal.

The invention will be more readily understood from the disclosure to follow and from the drawings in which:

FIGURE 1 is a perspective view, partly broken away, of a collector basin installed in the ground and showing a plurality of attached collecting fingers.

FIGURE 2 is a perspective view, partly broken away, showing a large separator trap with outlets for removing the petroleum product and distributor system for recycling the water.

In the drawings, a cylindrical collector basin 10 is shown buried in the ground 11 which has an area 12 contaminated by a petroleum product. The basin is constructed of a suitable material such as mild steel and has a circular side 13, top 14 and bottom 15. An entry port 16 is provided to service the interior, the port being sealed with a removable cap 17 which just protrudes above the ground level. A plurality of downwardly inclined, hollow, open-ended, collector fingers 18 are mounted peripherally about the basin and are designed to drain downwardly from the contaminated area 12 into the basin. To improve drainage, the fingers are covered with gravel 21 and are positioned at the level of the water table with the high end two inches above the water table and the low end two inches below the water table. Consequently the water table level governs the depth to which they are buried. This water table is located at varying depths in the ground and will fluctuate from times of drought and times of heavy rain. The petroleum product will drop through the ground until it reaches the water table at which point it will then float on the water table. The collector fingers should be laid with open joints and the top half of the open joint should be covered with a suitable material, such as polyethylene film, over the upper half of the opening to prevent entrance of gravel, sand and soils. The positioning of the fingers around the circular side 13 is determined by the amount and concentration of petroleum products in a particular area and this may be ascertained by borings. The bottom 15 of the basin, which may be poured concrete, is placed a short distance (about three feet) below the water table to ensure constant drainage of the fingers. A liquid 22 entering the basin from the fingers, forms a pool 23, at the bottom of the basin; when a suitable level has been attained, the mixture is pumped out the basin by an explosion-proof submerged pump 24 along pipes 25 and 26. A valve 27 is provided on pipe 26 to prevent liquid from returning to the basin. Power for the pump is supplied by an electrical connection (not shown) through the removable cap 17.

If only small amounts of petroleum products are being removed from the ground over extended time intervals, it is feasible to permit the petroleum product and water to separate into upper and lower phases in the basin 10. The petroleum product is then recovered by pumping it off as the upper phase. As the water accumulates, it will rise until reaching a specified level, and is then pumped off separately and recycled to the contaminated ground, if desired.

In the preferred embodiment of this invention, particularly when large amounts of water are being circulated quickly, the phase separation is carried out in a container trap 28 having a much larger capacity than the collector basin 10. As shown in FIGURE 2, the mixture 22 of petroleum product and water is pumped from the basin through pipes 25 and 26, into the container trap situated at a point elevated from the basin. If desired the trap may be above ground, or it may be buried. This will depend upon such things as landscaping effects, elevation, excavating problems, etc. The mixture 22 is pumped into the trap at the top and is permitted to separate into an upper petroleum product phase 31 and a lower water phase 32 which collects at the bottom of the trap. The upper phase 31 is pumped out of the trap by pump 33 through line 34 to storage. A pipe 35 with its inlet positioned in the lower part of the trap siphons off water from the trap and discharges it downwardly into a distribution system. This distribution system includes a distributor box 36 interconnected to distributor boxes 37 and 38 via pipes 39 and 40. The three distributor boxes feed an array of field tiles 43 extending in lines downwardly away from the distributor boxes and laid about one foot over the water table. The tiles may be located so as to discharge water immediately above the area bearing petroleum products 12 or the tiles may be located at a distance uphill from the area. In the latter case, the water discharged from the tiles will enter and flow downwardly along the water table. It then contacts the petroleum product to form a mixture of water and petroleum product which is picked up by the fingers and gravitated to the collector basin 10.

In operation, water passing into the ground 11 from the tiles 43, percolates downwardly through the area 12 bearing the petroleum product. The water also may be naturally occurring such as rain or it may be recirculated or newly added water. Upon contact with the petroleum product, the water will carry some of it into the collecting fingers 18 positioned in the water table, and the mixture 22 of water and petroleum product will feed downwardly into the collector basin 10 and form pool 23. In certain geological formations, dense clay, rock, etc. may be sufficient to trap the mixture for feeding to the basin and thereby obviating the need for a water table. When the pool has attained a suitable predetermined level in the basin, pump 24 automatically becomes actuated and pumps the mixture from the basin through pipes 25 and 26 into the container trap 28 where phase separation is carried out. The upper petroleum product phase 31 is pumped out of the trap for subsequent reclaiming and the lower water phase 32 is siphoned or pumped to the distributor boxes 36, 37 and 38 and the field tiles 43. The recycling process then continues.

After the petroleum products have been removed from an area, the apparatus can be left in place and used in flood control to minimize the effects of a heavy rain, spring runoff, etc. If the container trap has a sufficiently large capacity, it will function as a temporary storage for these excess waters and the stored water can be discharged harmlessly. Obviously the apparatus of this invention can be installed for the sole purpose of controlling water flooding and water storage.

Other materials besides petroleum products may, of course, be removed by the process and apparatus of this invention. For example, the insecticide DDT when present in undesirable quantities may be recovered. Inorganic compounds may be extracted from the ground by formation of a separate phase with water or other suitable reactant or solvent and passing into the container trap for additional treatment if necessary to facilitate phase separation. This treatment can involve precipitation and filtering, or phase formation (including gaseous formation) followed by removal of the phases, etc.

The apparatus of the present invention is very simple, the main bulk of the work being performed by the natural flow of water and gravity. Since the only mechanical component is the pump, little or no maintenance of the system is required.

I claim:

1. A process for removing a petroleum product from the ground which comprises: applying water to the area containing the product to form a mixture of water and petroleum product; allowing the mixture to percolate downwardly through the ground to the water table; collecting the mixture with a plurality of collecting fingers positioned at the water table; forwarding the mixture from the collecting fingers to a collecting basin and then to a container; forming water and petroleum product phases in the container; and separately removing the petroleum product phase and the water phase.

2. The process of claim 1 in which the water is circulated through a plurality of field tiles to the area containing the remaining petroleum product.

References Cited

UNITED STATES PATENTS

| 2,622,683 | 12/1952 | Silitch et al. | 210—170 X |
| 2,802,339 | 8/1957 | Fogerty | 210—170 X |
| 2,884,132 | 4/1959 | Kangas | 210—170 X |
| 2,986,279 | 5/1961 | Henigman | 210—83 X |
| 3,306,456 | 2/1967 | Fromson et al. | 210—256 |

REUBEN FRIEDMAN, *Primary Examiner.*

J. L. DE CESARE, *Assistant Examiner.*

U.S. Cl X.R.

210—170